Figure 2:
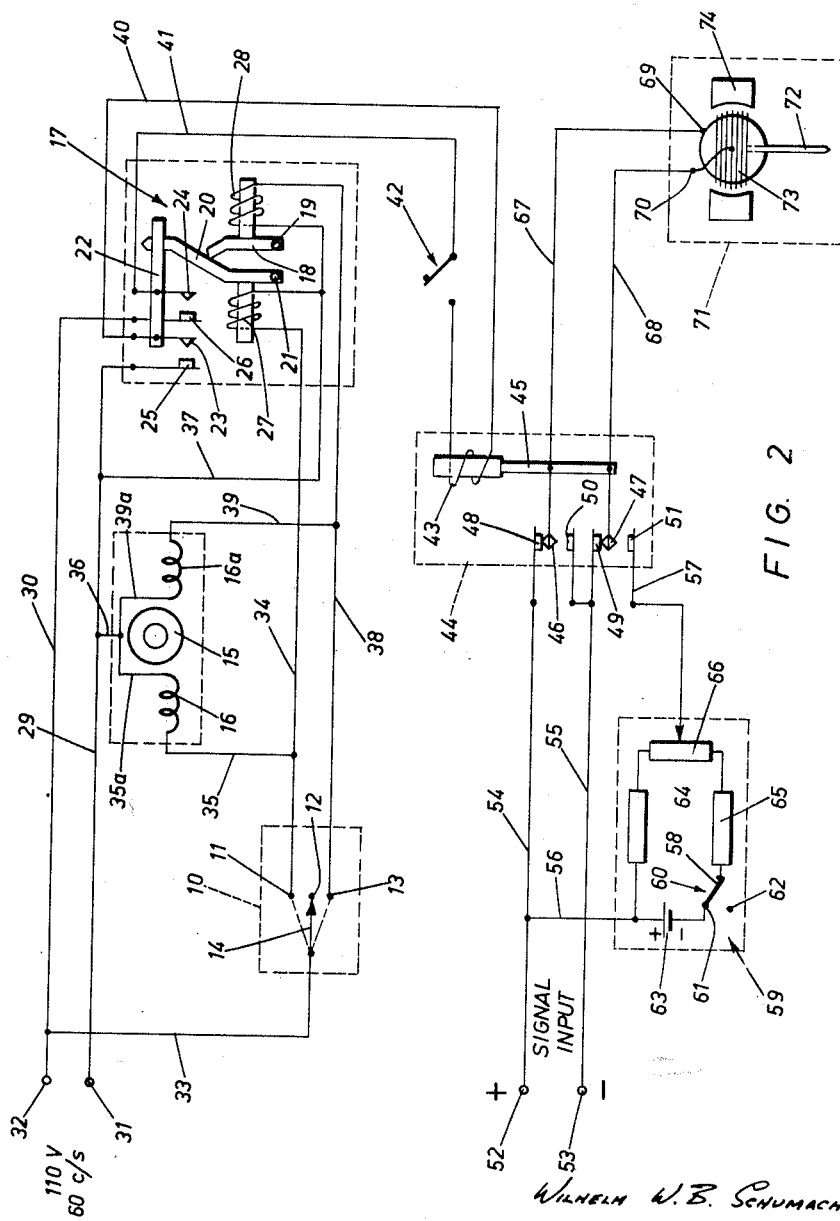

Dec. 29, 1964   W. W. B. SCHUMACHER   3,163,488
RECORDER
Filed July 9, 1963   3 Sheets-Sheet 1
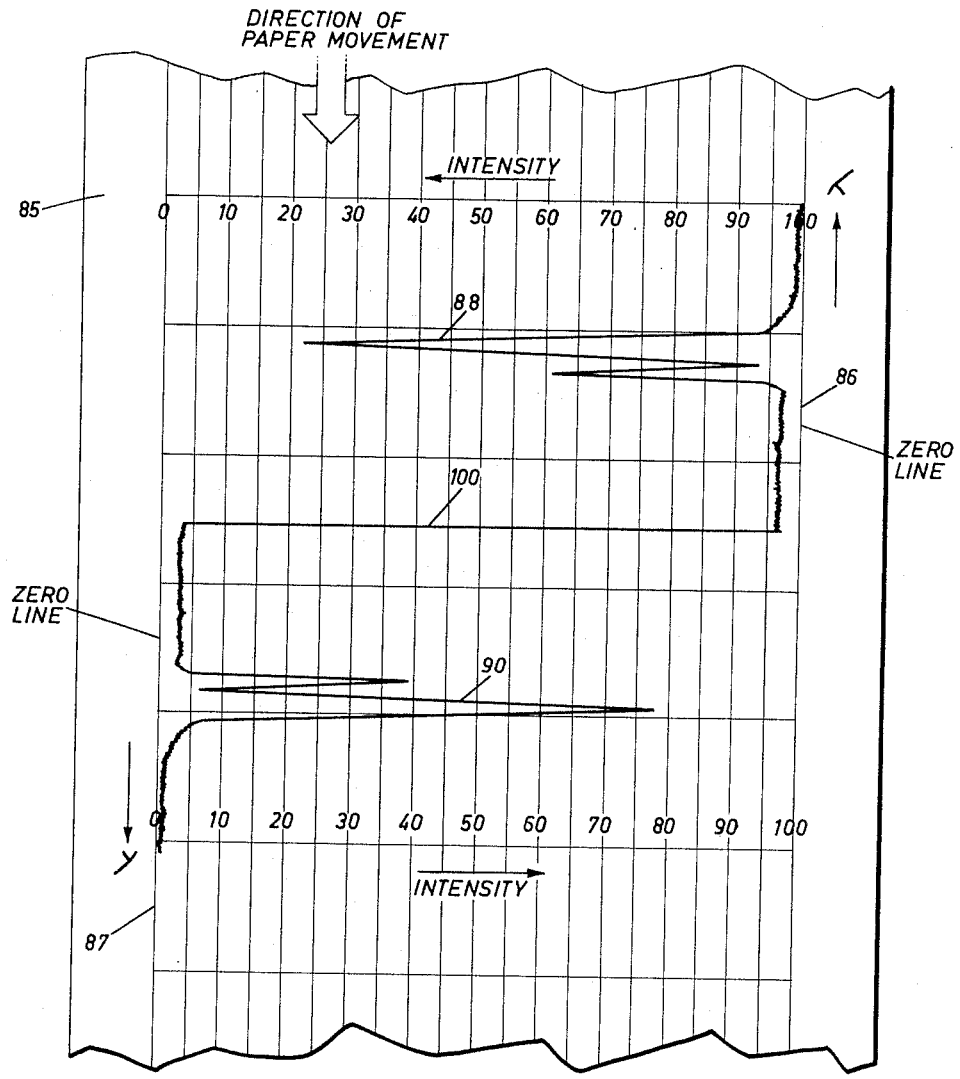
FIG. 1
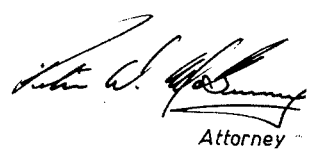
INVENTOR.
BY
Attorney Dec. 29, 1964 W. W. B. SCHUMACHER 3,163,488
RECORDER
Filed July 9, 1963 3 Sheets-Sheet 3
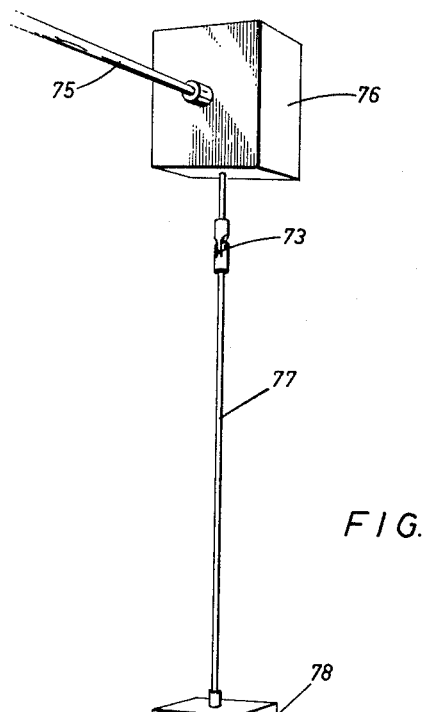
FIG. 3
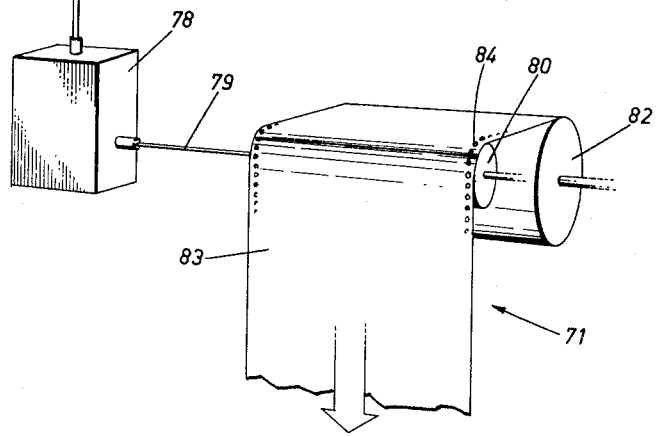
Wilhelm W.B. Schumacher
INVENTOR.
BY
Attorney

United States Patent Office 3,163,488
Patented Dec. 29, 1964

3,163,488
RECORDER
Wilhelm W. B. Schumacher, Don Mills, Ontario, Canada, assignor to Ontario Research Foundation, Toronto, Ontario, Canada
Filed July 9, 1963, Ser. No. 293,665
12 Claims. (Cl. 346—33)

This invention relates to a recorder. More particularly, this invention relates to a recorder particularly suited for use with a scanning spectrometer and adapted to record the intensity of the radiation emitted or transmitted by a material being analysed by the spectrometer.

While this invention will be described hereinafter in connection with its use as a recorder for spectrometers, it will be appreciated that this use is only illustrative, and recorders embodying this invention may be employed in many other applications. However, for reasons which will become more apparent, a recorder embodying this invention, by virtue of its special characteristics, is particularly suited for use in recording the intensity of radiation emitted or transmitted by a material being analysed by a spectrometer.

Generally speaking, there are in use today two broad types of recorders for spectrometers. One type is known as a strip chart recorder. Such a recorder has the advantage that a continuous supply of record paper is available, and a new piece of paper is available for each record. However, as is well known, it is common practice in the operation of spectrometers to cause the spectrometer to scan the spectrum of a material being analyzed from long wavelengths to short wavelengths and vice versa, and, to this end, the spectrometer drive is made reversible. During the reverse run of a spectrometer, a conventional strip chart recorder has the disadvantage that it produces a record of the spectrum of the material being analysed which is a mirror image of the record made during the forward run of the spectrometer.

The other type of spectrometer recorder in use today is known as a drum recorder. In such a recorder a chart is mounted on a large drum which reverses when the spectrometer drive reverses. Such a recorder has the disadvantage that a continuous supply of paper is not available. Furthermore, with such a recorder, the record made during the reverse run of the spectrometer is made on the same chart as the record made during the forward run of the spectrometer, the forward and reverse traces often being superimposed. Consequently, it often is not possible to determine from the completed record which trace was written during the forward run of the spectrometer and which during the reverse run.

Accordingly, it is an object of this invention to provide a recorder wherein a continuous strip of recording material is available, so that the forward and reverse traces are made on separate parts of the recording material, but also which is constructed so that when the chart on which the forward and reverse traces are made is cut, and the two sections are placed before an observer with the zero line at the bottom, the spectra recorded on the charts will be the same.

It is another object of this invention to provide a recorder which operates in such a manner that the record made thereby during the forward run of a spectrometer is readily discernible from the record made during the reverse run of the spectrometer.

In brief, a recorder embodying this invention comprises record means on which to record information together with writing means for impressing information on the record means. Driving means are provided for driving the record means relative to the writing means. Actuating means actuate the writing means in accordance with an electrical information containing signal to be recorded on the record means by the writing means. Means are provided for supplying electrical energy to these actuating means. In accordance with the invention the last mentioned means include means for reversing the polarity of the electrical signal supplied to the actuating means and biasing means for biasing the writing means when the electrical signal supplied to the actuating means is of one polarity.

This invention will become more apparent from the following detailed disclosure taken in conjunction with the appended drawings, in which:

FIGURE 1 shows a chart on which traces have been made by a recorder embodying this invention during both the forward and reverse runs of a spectrometer, the chart showing wavelength plotted against the intensity of the radiation emitted or transmitted by a material being analysed by the spectrometer, FIGURE 2 is a schematic representation of the control system of a recorder embodying this invention, and FIGURE 3 is a schematic representation of a typical drive for a recorder embodying this invention.

Referring to FIGURE 2, there is shown a switch 10 having reverse, stop and forward fixed contacts 11, 12 and 13 respectively and a movable contact 14. There also is shown an electric motor 15 with field coils 16 and 16a, and a latching relay 17 having a latch 18 pivotable at 19 and an armature 20 pivotable at 21. One arm 22 of armature 20 carries movable contacts 23 and 24 which are adapted to contact fixed contacts 25 and 26 respectively in one position of armature 20. Armature 20 has an actuating coil 27 associated therewith, as does latch 18, the latter coil being numbered 28. Motor 15 drives a spectrometer (not shown).

Fixed contacts 25 and 26 are connected via conductors 29 and 30, respectively, to line terminals 31 and 32, respectively. Movable contact 14 is connected to conductor 30 via a conductor 33. Fixed contact 11 is connected to conductor 29 via a conductor 34, a conductor 35, field coil 16, a conductor 35a and a conductor 36, and also via conductor 34, coil 27 and a conductor 37. Fixed contact 13 is connected to conductor 29 via a conductor 38, a conductor 39, field coil 16a, a conductor 39a and conductor 36, and also via conductor 38, coil 28 and conductor 37.

Movable contacts 23 and 24 are connected by conductors 40 and 41, respectively, through an on-off switch 42 to opposite ends of the coil 43 of a reversing relay 44. Relay 44 has a movable armature 45 which carries movable contacts 46 and 47 which are electrically connected to fixed contacts 48 and 49, respectively, in one position of armature 45 and to fixed contacts 50 and 51, respectively, in the other position of armature 45.

A D.C. electrical signal indicative of the intensity of the radiation emitted or transmitted by a material being analysed by the spectrometer driven by motor 15 is supplied to terminals 52 and 53 and has the polarity indicated in FIGURE 2. This signal is transmitted to contact 48 via a conductor 54 and to contacts 49 and 50 via a conductor 55. It also is supplied to contact 51 through a conductor 56 connected to conductor 54, a conductor 57 connected to contact 51 and a network 59 connected between conductors 56 and 57 and consisting of an on-off switch 60 having a movable contact 58 and fixed contacts 61 and 62, a source of bias potential in the form of a battery 63, two parallel resistors 64 and 65 and a potentiometer 66, all connected as shown in FIGURE 2.

Movable contacts 46 and 47 are connected by conductors 67 and 68, respectively, to the input terminals 69 and 70, respectively, of a conventional strip chart recorder schematically indicated at 71.

Recorder 71 is conventional in nature and may be any of the strip chart recorders presently available. It may be, for example, a "Dynamaster" (trademark) recorder model 1P12H–560–T15–T38–B–14 sold by the Bristol Company of Canada Limited. This is a potentiometer recorder, but, for the sake of simplicity, recorder 71 in FIGURE 2 has been shown schematically to be of the galvanometric type where a stylus 72 is connected to a moving coil 73 between permanent magnets 74, terminals 69 and 70 being connected to coil 73. Movement of coil 73, as a result of an electrical signal supplied thereto, causes a proportionate movement of stylus 72. Those skilled in the art will appreciate that such a recorder 71 as is schematically designated in FIGURE 2 generally is provided with means to convert rotary motion of coil 73 into linear, rather than rotary, movement of stylus 72, but such means are conventional and, for the sake of simplicity, have been omitted.

Referring to FIGURE 3, the drive for strip chart recorder 71 is schematically illustrated. In FIGURE 3 shaft 75 is a shaft which is driven from spectrometer drive motor 15 and which rotates in both directions at a speed which is proportionate to the speed of scan of the spectrometer. Shaft 75 drives a unidirectional output drive mechanism 76 which, in turn, drives an output shaft 77 having a universal joint 78 therein. Mechanism 76 operates in such a manner that shaft 77 always rotates in one direction, regardless of the direction of rotation of shaft 75. Mechanism 76 may be, for example, of the type shown on page 347 of "Ingenious Mechanisms for Designers & Inventors" Volume II, edited by Franklin D. Jones, 11th printing—1957, The Industrial Press, 93 Worth Street, New York 13, New York. Shaft 77 drives a speed reduction unit 78, the output shaft 79 of which drives the upper roller 80 of recorder 71. Recorder 71 has a roll 82 of recording paper 83 with perforated margins, the latter being engaged by teeth 84 on roller 80 to move paper 83 at a speed proportional to the speed of scan of the spectrometer, and always in the same direction, regardless of the direction of movement of the spectrometer. While stylus 72 is not shown in FIGURE 3, it will be appreciated that it rests on paper 83 at roller 80.

A chart 85 recorded with apparatus embodying this invention is shown in FIGURE 1. The zero line for the upper record 88 written by stylus 72 is at 86, while the zero line for the lower record 90 is at 87. These records are typical of records made during the forward and revese runs of the spectrometer driven by motor 15. However, each record is on a separate sheet of paper, and when chart 85 is cut and the records are placed with their zero lines coincident, the records are identical. Moreover, it is readily apparent which record was made during the forward run of the spectrometer and which during the reverse run.

Referring back to FIGURE 2, record 90 is made during the forward run of the spectrometer when movable contact 14 engages fixed contact 13, and latching relay 17 and reversing relay 44 are in the position shown in FIGURE 2.

Preparatory to the making of record 90 and when conditions are such that there is no signal applied to terminals 52 and 53, stylus 72 is set on zero line 87. The means for so setting the stylus are incorporated in recorder 71, are conventional in nature and form no part of the present invention. In the case of a potentiometer type recorder the zero setting means may be electrical in nature, as is well known, but, in other types of recorders mechanical zero setting means may be employed. In any event, as aforementioned, the zero setting means are built into recorder 71, which, as aforementioned, is a conventional piece of equipment.

When a signal is applied to terminals 52 and 53 with the circuit conditions being as shown in FIGURE 2, terminal 69 becomes positive, terminal 70 becomes negative and current flows through coil 73 in one direction causing stylus 72 to deflect in one direction, i.e., to the right of zero line 87 in FIGURE 1, to write record 90. The degree of deflection of stylus 72 to the right of zero line 87 in FIGURE 1 is dependent, of course, on the magnitude of the signal applied to terminals 52 and 53.

When the spectrometer drive is reversed by moving contact 14 into engagement with contact 11, thereby energizing coils 27 and 28, closing contacts 23 and 25 and contacts 24 and 26, energizing coil 43 and closing contacts 46 and 50 and contacts 47 and 51, the polarity of the signal supplied to recorder 71 is reversed, terminal 69 becoming negative, and terminal 70 becoming positive. At the same time, the bias voltage from battery 63 is applied through the remainder of network 59 to terminal 70, this bias voltage previously having been adjusted by potentiometer 66 to give full scale deflection of stylus 72. Thus, as is shown by line 100 in FIGURE 1, when the direction of scan of the spectrometer is reversed by reversing motor 15, stylus 72 moves from one zero line 87 to the other zero line 86, and, because of the polarity reversal of the signal to recorder 71, stylus 72 always writes between zero lines 86 and 87 and never to the left of line 87 or the right of line 86. In other words, if it is assumed that when the spectrometer drive is reversed there is no signal applied to terminals 52 and 53, stylus 72 will be biased to zero line 86 by battery 63, as shown by line 100, because the bias voltage from battery 63 is adjusted by potentiometer 66 for full scale deflection of stylus 72 from zero line 86 to zero line 87. When a signal is applied to terminals 52 and 53, stylus 72 is actuated in the opposite direcion to its movement during a forward run of the spectrometer, because positive terminal 59 now is connected to terminal 70, while negative terminal 53 now is connected to terminal 69, so that the direction of current flow through coil 73 is reversed. Thus record 88 is written to the left of zero line 86.

While preferred embodiments of this invention have been disclosed in detail, those skilled in the art will appreciate that changes and modifications may be made therein without departing from the spirit and scope of this invention.

What I claim as my invention is:

1. In a recorder comprising record means on which to record information, writing means for impressing information on said record means, driving means for driving said record means relative to said writing means, actuating means for actuating said writing means in accordance with an electrical information-containing signal to be recorded on said record means by said writing means, and means for supplying said electrical signal to said actuating means, said recorder being of the type wherein said writing means is actuable by said actuating means from a first reference position on said record means for electrical signals of one polarity supplied to said actuating means, the improvement comprising biasing means adapted to bias said writing means through a predetermined deflection away from said first reference position to a second reference position on said record means, and wherein said means for supplying said electrical signal to said actuating means include means for reversing the polarity of said electrical signal supplied to said actuating means and for rendering said biasing means operative to bias said writing means when the polarity of said electrical signal supplied to said actuating means is reversed from said one polarity to the opposite polarity, said writing means being actuable by said actuating means from said second reference position for electrical signals of said opposite polarity supplied to said actuating means.

2. The invention according to claim 1 wherein said driving means drives said record means in only one direction relative to said writing means.

3. The invention according to claim 2 wherein said biasing means comprises a source of D.C. potential for supplying a D.C. biasing current to said actuating means.

4. The invention according to claim 3 wherein said means for reversing the polarity of said electrical signal supplied to said actuating means comprises relay contacts.

5. In a recorder comprising record means on which to record information, writing means for impressing information on said record means, driving means for driving said record means relative to said writing means, actuating means for actuating said writing means in accordance with a D.C. electrical information-containing signal to be recorded on said record means by said writing means, and means for supplying said electrical signal to said actuating means, said recorder being of the type wherein said writing means is actuable by said actuating means from a first reference position on said record means for electrical signals of one polarity supplied to said actuating means, the improvement comprising biasing means adapted to bias said writing means through a predetermined deflection away from said first reference position to a second reference position on said record means, and wherein said means for supplying said electrical signal to said actuating means include means for reversing the polarity of said electrical signal supplied to said actuating means and for automatically and simultaneously rendering said biasing means operative to bias said writing means when the polarity of said electrical signal supplied to said actuating means is reversed from said one polarity to the opposite polarity, said writing means being actuable by said actuating means from said second reference position for electrical signals of said opposite polarity supplied to said actuating means.

6. The invention according to claim 5 wherein said driving means drives said record means in only one direction relative to said writing means, and wherein said biasing means comprises a source of D.C. potential for supplying a D.C. biasing current to said actuating means.

7. In combination with a scanning spectrometer having means for producing an electrical signal indicative of the intensity of the radiation emitted or transmitted by a material being analyzed and means for reversibly driving said spectrometer to scan the spectrum of the material being analyzed from long wavelengths to short wavelengths and from short wavelengths to long wavelengths; a recorder comprising record means on which to record said intensity of radiation emitted or transmitted by the material being analyzed by said spectrometer, writing means for impressing information as to said intensity on said record means, driving means for driving said record means relative to said writing means, actuating means for actuating said writing means in accordance with said electrical signal derived from said spectrometer and indicative of said intensity, said electrical signal to be recorded on said record means by said writing means, and means for supplying said electrical signal to said actuating means, said recorder being of the type wherein said wiring means is actuable by said actuating means from a first reference position on said record means for electrical signals of one polarity supplied to said actuating means, the improvement comprising biasing means adapted to bias said writing means through a predetermined deflection away from said first reference position to a second reference position on said record means, and wherein said means for supplying said electrical signal to said actuating means include means for reversing the polarity of said electrical signal supplied to said actuating means and for rendering said biasing means operative to bias said writing means when the direction of scan of said spectrometer reverses from one direction to the opposite direction, said writing means being actuable by said actuating means from said second reference position for electrical signals of opposite polarity to said one polarity supplied to said actuating means.

8. In combination with a scanning spectrometer having means for producing a D.C. electrical signal indicative of the intensity of the radiation emitted or transmitted by a material being analyzed and means for reversibly driving said spectrometer to scan the spectrum of the material being analyzed from long wavelengths to short wavelengths and from short wavelengths to long wavelengths; a recorder comprising record means on which to record said intensity of radiation emitted or transmitted by the material being analyzed by said spectrometer, writing means for impressing information as to said intensity on said record means, driving means for driving said record means relative to said writing means, actuating means for actuating said writing means in accordance with said electrical signal derived from said spectrometer and indicative of said intensity, said electrical signal to be recorded on said record means by said writing means, and means for supplying said electrical signal to said actuating means, said recorder being of the type wherein said writing means is actuable by said actuating means from a first reference position on said record means for electrical signals of one polarity supplied to said actuating means, the improvement comprising biasing means adapted to bias said writing means through a predetermined deflection away from said first reference position to a second reference position on said record means, and wherein said means for supplying said electrical signal to said actuating means include means for reversing the polarity of said electrical signal supplied to said actuating means and for automatically and simultaneously rendering said biasing means operative to bias said writing means when the direction of scan of said spectrometer reverses from one direction to the opposite direction, said writing means being actuable by said actuating means from said second reference position for electrical signals of opposite polarity to said one polarity supplied to said actuating means.

9. The invention according to claim 8 wherein said driving means drives said record means at a speed proportional to the speed of scan of said spectrometer.

10. The invention according to claim 8 wherein said driving means drives said record means in the same direction relative to said writing means regardless of the direction of scan of said spectrometer.

11. The invention according to claim 10 wherein said driving means includes an electric motor, said spectrometer being driven by said electric motor.

12. The invention according to claim 10 wherein said biasing means comprises a source of D.C. potential for supplying a D.C. biasing current to said actuating means.

References Cited by the Examiner

UNITED STATES PATENTS

| | | | |
|---|---|---|---|
| 1,243,702 | 10/17 | Buck | 346—33 |
| 1,827,178 | 10/31 | Tonietti | 346—49 |
| 1,901,921 | 3/33 | Means | 346—1 |
| 2,351,548 | 6/44 | Schwartz et al. | 324—85 |
| 2,644,738 | 7/53 | Gardner | 346—76 |
| 2,647,033 | 7/53 | Faus. | |
| 2,717,192 | 9/55 | Chappell | 346—139 |
| 2,860,250 | 11/58 | Pouppirt | 346—149 |
| 2,883,256 | 4/59 | Nichols | 346—49 |
| 2,985,498 | 5/61 | Freeman | 346—33 |
| 2,993,741 | 7/61 | Maltby et al. | 346—139 |

LEO SMILOW, *Primary Examiner.*

LEYLAND M. MARTIN, *Examiner.*